No. 781,520. Patented January 31, 1905.

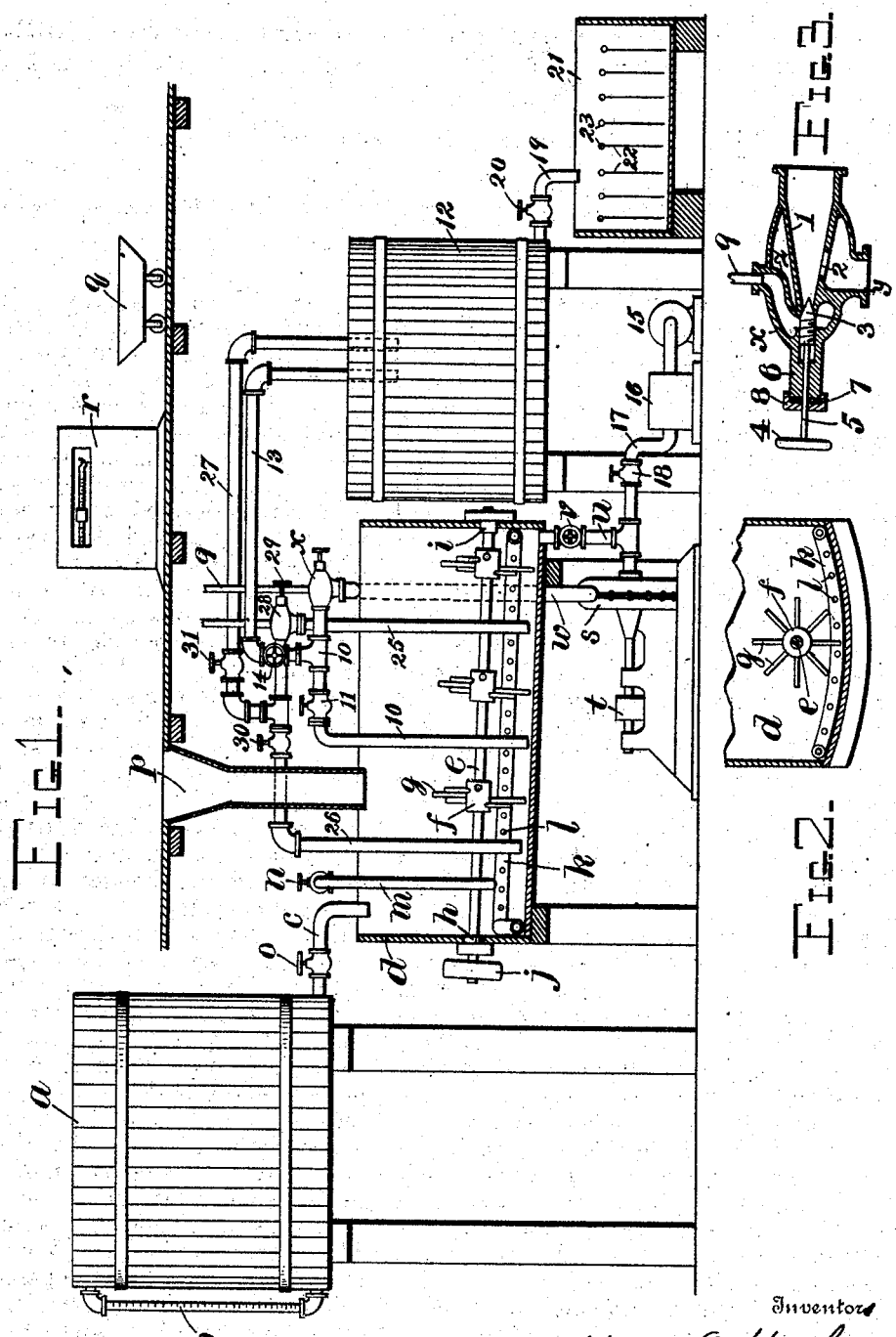

UNITED STATES PATENT OFFICE.

HASCAL A. HOGEL AND HERBERT A. HOGEL, OF NEW YORK, N. Y., ASSIGNORS TO SAID HASCAL A. HOGEL AND DAVID WALLACE, OF NEW YORK, N. Y.

METHOD OF TREATING ORES.

SPECIFICATION forming part of Letters Patent No. 781,520, dated January 31, 1905.

Application filed March 5, 1902. Renewed June 29, 1904. Serial No. 214,687.

*To all whom it may concern:*

Be it known that we, HASCAL A. HOGEL and HERBERT A. HOGEL, citizens of the United States, residing at New York, in the county of New York and State of New York, have invented certain new and useful Improvements in Methods of Treating Ores; and we do hereby declare the following to be a full, clear, and exact description of the invention, such as will enable others skilled in the art to which it appertains to make and use the same.

Our invention relates to improvements in methods of treating ores. It is applicable to a large variety of ores, especially those containing gold, silver, copper, zinc, and similar ores. It is especially valuable for the ores containing the metals named, but of course is not restricted in its application to such ores. It is also applicable to the treatment of slimes of all sorts, especially those resulting from ordinary amalgamation.

Our process refers to the treatment of ores in the wet way—that is to say, in which the metals are separated from the gangue and waste by dissolving them out therefrom and then recovering the metals from the solutions. We do not restrict ourselves to any particular method or any particular chemicals or combination of chemicals to effect this solution, these matters being determined by the character of the ore under treatment.

The particular object of our method is to effect the solution of the metals and their consequent separation from the gangue and waste in a much more rapid and economical manner than has hitherto been possible. We accomplish this in the manner and by the apparatus hereinafter described.

In the accompanying drawings, which illustrate an apparatus for carrying our invention into effect, Figure 1 is a side elevation, partly in section, of our apparatus. Fig. 2 is a cross-section of the main or mixing tank, and Fig. 3 is a detail view of the injector or aspirator which forms one of the important parts of our apparatus.

This aspirator has been in use for a number of years and for a variety of purposes. For example, in Patent No. 378,684, dated February 28, 1888, an aspirator of a similar construction was used in connection with the manufacture of salt, and in Patent No. 671,380, dated April 2, 1901, a similar aspirator was shown in connection with a rendering apparatus, and, as said before, this aspirator is one of the important points of our invention.

In Fig. 1, $a$ represents an open tank, which is usually kept filled with a standardized solution of any desired chemical or chemicals. The constituents and strength of this solution are of course determined by the character of the ore under treatment. For example, we may use a cyanid solution in the treatment of ores carrying free gold and silver. For copper ores a different solution will be used, and so on. This tank is provided with a glass tube $b$, which is divided off so that a definite quantity of the solution may be drawn off through the pipe $c$ into the mixing-tank $d$ without trouble. The mixing-tank $d$ is of any suitable size and shape, built of some material which the chemicals used in the solution will not attack. We generally prefer to make it of wood, but of course we do not restrict our invention in this respect. The tank is preferably inclined, as shown in Fig. 1, and provided with a slightly-curved bottom, as shown in Fig. 2. Within the tank is a mechanical agitator consisting of a shaft $e$, having affixed thereto hubs $f$, provided with stirrer-arms $g$. This shaft is mounted in bearings $h$ and $i$, located in the sides of the tank and packed, if preferred, in order to prevent the liquid from leaking. The shaft is driven by means of a pulley $j$, operated from any desired source of power. We do not restrict ourselves, however, to the particular type of agitator shown. For example, we might use an ordinary rotating agitator provided with stirrer-arms mounted on the top of the tank and projecting out thereinto. In fact, any well-known means of agitating the material in the tank $d$ may be employed.

$k$ represents a pipe located at or near the bottom of the tank $d$ and provided with perforations $l$. This pipe is connected with a pipe $m$, which is provided with a valve $n$. Steam is admitted through the pipe $m$ when desired and passes out through the perforations $l$ into the material contained in the tank $d$, thereby heating the material in said tank and aiding in the mixing operation. If desired, air, either hot or cold, may be forced through the pipe $m$ instead of steam, or a combination of the two may be used. The solution is of course admitted into the tank $d$ through the pipe $c$, which is provided with a valve $o$.

$p$ represents a hopper through which the ore is discharged into the mixing-tank. This ore is brought in on a car $q$, from whence after being weighed by means of the scales $r$ a definite charge is delivered into the mixing-tank. The ore before being put into the mixing-tank is preferably pulverized as fine as desired in order to hasten the action of the solution thereon.

$s$ represents a pump of any desired type, but preferably a centrifugal pump, which is driven by means of the pulley $t$, the power being derived from any suitable source. This pump is connected with the tank $d$, preferably at the lowest point thereof, by means of a pipe $u$, provided with a valve $v$, which pipe acts to deliver the solution mixed with the ore to the center of the pump. The pump discharges into the pipe $w$, which at its upper end connects with the aspirator $x$. This aspirator, which forms one of the important features of our invention, is shown in detail in Fig. 3. It is made upon the injector principle and includes a part $y$, fitting upon the pipe $w$. The main shape of the casing of the aspirator is oval, as shown in Fig. 3. It is provided with a partition $z$, through which a conical-shaped discharge-pipe 1 passes. This pipe is perforated, as shown at 2, for the admission of the mixture driven by the pump, and the smaller open end thereof is closed by an adjustable needle-valve 3, provided with a hand-wheel 4, mounted on a rod 5. This valve is screw-threaded into an opening in the casing of the aspirator, and by screwing it back and forth the area of the opening at the small end of the pipe 1 may be varied as desired. The rod 5 is journaled in an extension 6 of the casing, the power end of which extension is preferably provided with a packing 7 and a covering-nut 8. 9 represents a pipe delivering into said casing. Usually steam is used in this pipe 9 and steam at a considerable pressure; but we do not restrict ourselves in this respect, and, indeed, air, either hot or cold, may be substituted for the steam. The action of this aspirator thoroughly atomizes, so to speak, the mixture of the ground ore and solution, which is delivered through the opening 2. At the same time this mixture is heated and thoroughly mixed with steam if, as usual, steam is delivered through the pipe 9. The result is that each particle of the ore is intimately mixed with the solution and with steam or steam and air combined, so that the conditions are eminently favorable for quick and rapid solution. If the character of the ore is such as to require it, oxygen may be supplied thereto to oxidize it from the air, or in some instances this oxygen may be derived from steam itself; but the important feature of the process at this point is that each particle of the ore, no matter how small, is brought into intimate contact with the solution under the influence of heat at the same time, the result being that the time necessary to dissolve the metals out of the ore is diminished in a very great degree. After the mixed ore and solution has passed through the aspirator it is delivered into a pipe 10 by said aspirator provided with a hand-valve 11, which pipe 10 is bent down into the tank $d$. In Fig. 1 for convenience we have shown this pipe as coming down in about the center of the tank; but the preferable arrangement would be to have it enter at a point above the highest part of the bottom of the tank near the pipe $m$—for example, opposite to the end from whence the material is delivered to the pump.

By the means already described a constant circulation of the material under treatment is established. It passes down through the pipe $u$, is lifted by the pump $s$, passes through the aspirator $x$, and is delivered through the pipe 10 back into the tank, at the same time being agitated by mechanical means, as by the arms $g$ and also by the steam or air driven in through the openings $l$, the result being a most effectual and rapid agitation of the whole mass, bringing every particle of the ore into intimate contact with the solution under the influence of heat at the same time. Under such conditions the solution of the metals in the ore is extraordinarily rapid. With some varieties of ore it is desirable to supply large amounts of oxygen to aid in the action of the solution upon the metals in the ore, and in Fig. 1 we have shown means for doing this. After the ore has been subjected to the action of the solution for a sufficient space of time, which in most cases is a very short time, the mixed ore and solution is discharged into the filter-tank 12 through the pipe 13, which is provided with a valve 14. All that it is necessary to do is to close the valve 11 and open the valve 14 without stopping the apparatus, and the combined action of the pump and aspirator will force the ore and solution into the filter-tank 12.

15 represents a blower of any well-known type which delivers air either hot or cold into a chamber 16, which may also be an oxygenator, if desired, which chamber delivers into a pipe 17, which in turn delivers to the center of the centrifugal pump $s$. The pipe 17 is provided with a valve 18, whereby the flow of air in said pipe may be wholly or partly cut off. In some instances, indeed, pure oxygen may be used instead of air, although under ordinary circumstances air answers all requirements.

After the ore and solution are delivered into the filter-tank 12 the liquid settles through the filter-bed, passes out through the pipe 19, provided with a valve 20, into the deposition-tank 21, in which in Fig. 1 there are shown iron sheets 22, hung on rods 23, on which sheets copper, for example, is deposited in the usual way. This deposition, or, in fact, the separation of the metals from the solution containing them, may be effected in any of the well-known ways, as by electrolysis or the use of any chemical agents. We do not restrict ourselves in any way in this respect. In some instances we find that the use of a pump is not necessary to cause the circulation of the material under treatment. If the heat is not too great and if the distance to which the material under treatment is to be raised is comparatively small, the aspirator itself will act to establish a complete circulation, and we have shown, in Fig. 1, therefore, an aspirator directly acting upon the material in the tank $d$. This part of the apparatus consists of the pipes 24, 25, 26, and 27, the aspirator 28, and the valves 29, 30, and 31, the action of this part of the apparatus being precisely the same as that already described in connection with the apparatus used with the pump $s$. Indeed, in some instances we find it desirable to use both forms in the same tank—that is to say, the form including the pump and the one without it.

In the drawings we have shown one solution-tank, one mixing-tank, one filter-tank, and one deposition-tank. It is obvious that in actual working many parts of the apparatus may have to be duplicated, and we do not limit ourselves in this respect nor to the particular details shown and described.

The operation of the apparatus has already been described in connection with the description of the apparatus, but it may be briefly recapitulated as follows: The pump and mechanical agitator being in action, a measured charge of the solution is delivered from the tank $a$ into the tank $d$ and a measured charge of prepared ore is also delivered into said tank. The mixing operation, of course, commences immediately, and the valves 5 and $v$ being open and steam being admitted through the pipe 9, a thorough atomization, heating, and mixing of the materials takes place. This action may be increased by the admission of steam or hot air through the pipe $k$, and by the admission of hot air or oxygen through the pipe 17. After the material has been subjected for a very short time to this action it is discharged into the filter-tank 12, the tank $d$ then being ready for the treatment of a new charge. The waste is retained in the tank 12, and the solution containing the metals passes into the deposition-tank 21, from whence the metals are recovered in the usual way.

Having thus described our invention, what we claim as new, and desire to secure by Letters Patent of the United States, is—

1. The method of treating ore to bring the metallic particles thereof into solution quickly, which consists in subjecting the ore to the action of a solution containing certain chemicals, and intensifying the solvent action of said solution upon said ore by atomizing the mixed mass.

2. The method of treating ore to bring the metallic particles thereof into solution quickly, which consists in pulverizing said ore, then subjecting it to the action of a solution containing suitable chemicals and intensifying and quickening the solvent action of the solution upon the ore by atomizing the mixed mass under influence of heat.

3. The method of treating ore to bring the metallic particles thereof into solution quickly, which consists in pulverizing said ore, then subjecting it to the action of a solution containing suitable chemicals and intensifying and quickening the solvent action of the solution upon the ore by atomizing the mixed mass under the influence of heat, and agitating the mixed mass by mechanical means.

4. The method of treating ore to bring the metallic particles thereof into solution quickly, which consists in pulverizing said ore, then subjecting it to the action of a solution containing suitable chemicals and intensifying and quickening the solvent action of the solution upon the ore by atomizing the mixed mass under the influence of heat, and agitating the mass by means of currents of air or steam.

5. The method of treating ore to bring the metallic particles thereof into solution quickly, which consists in pulverizing said ore, then subjecting it to the action of a solution containing suitable chemicals and intensifying and quickening the solvent action of the solution upon the ore by atomizing the mixed mass under the influence of heat, agitating the mixed mass by mechanical means, and at the same time agitating the mass by means of currents of air or steam.

In testimony whereof we affix our signatures in presence of two witnesses.

HASCAL A. HOGEL.
HERBERT A. HOGEL.

Witnesses:
J. STEPHEN GINSTO,
FRED W. ENGLERT.